ized powder forming) with K value 50–78; copolymers of vinyl chloride-vinylidene chloride containing less than 30% of vinylidene chloride, and having K value 60–70;

United States Patent Office 3,535,196
Patented Oct. 20, 1970

3,535,196
METHOD FOR THE FORMATION OF COMPOSITE STRUCTURES BASED ON EXPANDED POLYURETHANE MATERIAL WELDED TO A COVERING LAYER
Cesare Laberinti and Guido Paganelli, Milan, Italy, assignors to Pirelli, Societa per Azioni, Milan, Italy
No Drawing. Filed Mar. 13, 1967, Ser. No. 622,427
Claims priority, application Italy, Mar. 16, 1966, 5,880/66, Patent 15,597
Int. Cl. B32b 5/20
U.S. Cl. 161—160          7 Claims

ABSTRACT OF THE DISCLOSURE

A method for making a laminated structure wherein a cover layer comprising vinyl chloride polymer is bonded to a flexible expanded polyurethane layer by heat sealing, the polyurethane being prepared from polyesters or polyethers and other conventional polyurethane forming components in the presence of a vinyl polymer or copolymer in the form a plastisol or plasticized powder.

---

The present invention concerns a method for the formation of composite structures comprising a layer of flexible expanded polyurethane material joined to a covering layer of vinyl resin by means of high frequency welding and to the structure so obtained.

Such composite structures can be used as coverings for seats, covered upholsteries and in general as outer coverings having a soft and yieldable structure.

These structures are usually based on a covering layer of polyvinyl chloride resin or of vinyl-coated fabric molded in such a way as to impart to the covering the desired pattern, which is joined to a layer of expanded polyvinyl chloride resin. The two layers joined together by seams or, more advantageously, by means of electronic spot welding.

In view of the comparatively high cost of the expanded polyvinyl chloride material, attempts have been made to replace it with flexible expanded polyurethane matrial; this system, however, has given unsatisfactory results since the welding process is quite unsuitable for said material. In fact the conventional flexible expanded polyurethane material prepared from polyethers, because of its high melting point, cannot be softened during the welding treatment and does not adhere to the layer of polyvinyl chloride resin. Polyurethane material prepared from polyesters can be molded, but does not adhere to the covering layer.

The possibility of modifying the thermoplastic characteristics of flexible expanded polyurethane material, so as to make it heat-sealable to a covering based on polyvinyl chloride resin, by adding to said material fillers such as vinyl polymers and copolymers is already known. Said fillers can be added directly in the form of powder or grandules to one of the components of the urethane composition or, compounded with suitable plasticizers, can be added to the already expanded polyurethane by dipping, pressing or spraying.

It has now been found that it is possible to obtain an improvement in the ability of expanded polyurethane to be heat-sealed by adding vinyl polymers or copolymers in the form of plastisol or of plasticized powder to one of the components of the urethane mixture.

An object of the present invention is therefore a method for the formation of a composite structure intended to be used as coverings for seats, covered upholsteries and the like, and comprising a covering layer based on polyvinyl chloride resin and a layer of flexible expanded polyurethane material, which comprises adding a filler constituted by vinyl polymers or copolymers in the form of plastisol or plasticized powder to the polyether or polyester component of the urethane mixture, reacting the so charged polyether or polyester with an isocyanic compound in the presence of a catalyst, stablizers for the foam and a blowing agent, allowing the so formed urethane mixture to expand, covering the so formed expanded layer with the covering layer based on polyvinyl chloride and joining said layers by high frequency welding in an already known way.

A further object of the present invention is the so obtained composite structure.

The expanded polyurethane material is based on any polyurethane compound and is formed according to conventional techniques. In particular, it is preferred to use the "one-shot" process which, as it is known, is based on the direct blending of all the components. Said components are substantially constituted by a polyester of polyether having a molecular weight in the range of from 1500 to 5000, an isocyanic compound, a blowing agent, a catalyst for facilitating the formation and the setting of the foam, and an additive for the stablization of the latter.

The polyesters are constituted by condensation products of aliphatic or aromatic acids with glycols and in some cases with polyols. These are, of course, well-known materials used in preparing polyurethanes, and examples of such polyesters are described in U.S. Pat. 2,764,565 to Hoppe et al., Sept. 25, 1956.

The polyethers can be polyhydroxylated compounds constituted by condensation products of the polyethylenepropylene glycol or polypropylene glycol type, or condensation products of triols, such as glycerol or trimethylolpropane with propylene glycol, or condensation products of amino derivatives, such as ethylene diamine, with propylene oxide. The polyethers are also well-known in the manufacture of polyurethane and are illustrated in U.S. Pat. 2,948,691 to Windemuth et al. Aug. 9, 1960.

The isocyanic compounds can be diisocyanates, such as toluylene -diisocyanates, in general a mixture of 2,4- and 2,6-tolylene-diisocyanate. Suitable diisocyanates are also disclosed in the above referred to Pats. Nos. 2,764,565 and 2,948,691.

The catalysts which may be used are also known, and particularly preferred are tin compounds such as stannous octoate and stannous oleate and tertiary amines such as triethylenediamine and N-methylmorpholine. See "Modern Plastics," December 1964, pp. 148–160 and 194.

Also included with the polyurethane-forming ingredients are stabilizers such as silicone compounds and surface-active agents and blowing agents, e.g. water or water containing halogenated alkanes such as methylene chloride.

According to the present invention, a filter constituted by one or more vinyl polymers is added to the urethane mixture containing the ingredients able to form the flexible expanded polyurethane material. The vinyl polymers are selected among vinyl polymers and copolymers as polyvinyl chloride, vinyl acetate-vinyl chloride copolymer and vinyl chloride-vinylidene chloride copolymer, acrylonitrile polymers or copolymers, all obtained either by emulsion or by suspension polymerization. The vinyl polymers and copolymers useful in the process of this invention are those having an index K (Fikentscher index) between 40–82. Specific examples of suitable materials are straight polyvinyl chloride (plastisol forming resin emulsion type and suspension type) with K value 60–82; straight polyvinyl chloride (dry blending resins, plastiand copolymers of vinyl chloride-vinyl acetate containing less than 20% of vinyl acetate, and having K value 40–60.

The filler is added during the preparation of the expanded polyurethane material; in particular it is added in appropriate form to the urethane mixture, by blending it directly with one of the components of the latter, preferably the polyether or the polyester. The filler is preferably added in the form a plastisol by which means it is possible to obtain perfect dispersion in the polyether or polyester without resorting to mechanical processes which are necessary when the filler is added in the form of powder.

Another advantage deriving from the blending of the plastisol with the liquid component of the urethane mixture is that the filler, after the expansion of said mixture, is uniformly dispersed therein.

To obtain the plastisol, vinyl polymers or copolymers are employed, such as polyvinyl chloride obtained by emulsion polymerization, the very fine granules of which facilitate its complete dispersion in the plasticizer. It is also possible to use vinyl polymers or copolymers obtained by suspension polymerization, provided that their granules are very fine; in fact, in the contrary case, said vinyl polymers or copolymers are used in the form of plasticized powder obtained by mixing said products with an appropriate plasticizer. As it is known, the characteristics of size and surface of the granules permit an easy penetration of the plasticizer, so that the mixture is still in powder state. The amounts of plasticizer contained in the polymer may vary within a very wide range. The vinyl polymers or copolymers obtained by suspension polymerization may be in case added to the plastisol based on polyvinyl chloride obtained by emulsion polymerization.

The plasticizers used for the formation of the plastisol or of the plasticized powder are those generally adopted for the vinyl polymers: phthalates, adipates, sebacates, phosphates, chlorinated diphenyls, esters deriving from mono- and di-basic acids, as benzoic acid, and from glycol, as diethyleneglycol dibenzoate; polymeric plasticizers, as the polyester deriving from dibasic acids and glycols, as for instance polypropylene glycol adipate, and acrylonitrile copolymers.

In general, in the formation of the plastisol, suitable additives are employed, as for instance heat stabilizing agents or resins, in order to improve the peculiar ability of plastisol to melt, as the polyketone resins.

The amount of filler added to the flexible expanded polyurethane material is such that the vinyl polymers or copolymers are contained in an amount ranging between 5 and 70% and preferably between 50 and 70% based on the weight of the expanded polyurethane material.

In order to form the composite structure in accordance with the present invention, the layer of flexible expanded polyurethane material containing the filler is joined to a covering layer based on polyvinyl chloride. Said layer can be constituted by said resin, or by a vinyl-coated fabric, molded in such a way as to obtain the desired appearance.

The composite structure may comprise a further layer, either in the form of a fabric, e.g. vinyl-coated, or of a sheet of plastic material, such as polyethylene, which is placed against the lower surface of the layer of flexible expanded polyurethane material.

The different layers forming the composite structure may then be joined to one another by means of high frequency welding in an already known way.

The invention is further illustrated by the following examples without being restricted thereto, the parts being by weight.

A polyvinyl chloride plastisol and a plasticized powder forming polyvinyl chloride were respectively prepared. For this purpose, a polymer of vinyl chloride obtained by emulsion polymerization and having a K value 70 was used for the formation of the plastisol, and a polymer of vinyl chloride obtained by suspension polymerization and having a K value 55 was used for the formation of the plasticized powder. Each polymer was compounded with suitable plasticizers and stabilizers, as in the following recipe:

| Recipe I | Plastisol A | Plasticized powder |
|---|---|---|
| Polyvinyl chloride (K=70) | 100 | |
| Polyvinyl chloride (K=55) | | 100 |
| Di-2-ethylhexyl-phthalate | 57 | 57 |
| Dibutylphthalate | 10 | 10 |
| Epoxidized soybean oil | 3 | 3 |
| Barium-cadmium stabilizer | 2 | 2 |

Moreover, plastisols were prepared, respectively based on the above indicated polyvinyl chloride obtained by emulsion polymerization and on a vinyl chloride-vinyl acetate copolymer having a K value 48 (Plastisol B) or on a vinyl chloride-vinylidene chloride copolymer having a K value 65 (Plastisol C). The recipes of said plastisols are the following:

| Recipe II | Plastisol B | Plastisol C |
|---|---|---|
| Polyvinyl chloride (K=70) | 50 | 50 |
| Vinyl chloride-vinyl acetate copolymer (K=48) | 50 | |
| Vinyl chloride-vinylidene-chloride copolymer (K=65) | | 50 |
| Di-2-ethylhexyl-phthalate | 20 | 20 |
| Di-2-ethylhexyl-adipate | 10 | 10 |
| Benzylbutylphthalate | 20 | 20 |
| Di-propylene glycol dibenzoate | 30 | 30 |
| Epoxidized soybean oil | 3 | 2 |
| Barium-cadmium stabilizer | 2 | 3 |
| Chelating agent (triphenylphosphite) | 2 | 2 |

Lastly, a Plastisol D was prepared, based only on vinyl chloride-vinylidene chloride, according to recipe II; 100 parts of said copolymer were employed.

Both the plastisols and the plasticizer powder obtained as said above were used as fillers for a polyether suitable as the polyhydroxylic component of a urethane composition intended to give a flexible expanded polyurethanic material according to the "one-shot" process. For this purpose, a polyether was selected, constituted by the reaction product of glycerol and propylene oxide and having a molecular weight of 3500, and 100 parts of it were compounded separately with 50 parts of each plastisol or of the plasticized powder. The various polyethers charged in this way were then compounded with the usual components intended to form the urethanic composition, according to the following recipe.

Recipe III:
  Charged polyether _____ 100
  Water _____ 2.8
  Triethylenediamine _____ 0.15
  Tin octoate _____ 0.35
  Methylene chloride _____ 2
  Silicone _____ 1.5
  Toluylenediisocyanate _____ 36.3

Each of the so prepared urethanic compositions was caused to expand, as usually done, in the form of a continuous block. After suitable ageing of about 24 hours, each block was cut into layers of 5 mm.

A covering fabric coated with polyvinyl chloride was doubled to each layer and the specimen so obtained was subjected to thermal welding at a frequency of 28–30 mHz. for a time of 5 seconds. All the specimens appeared to be perfectly molded in the welded zone. Moreover, a high adherence was noticed between the covering of vinylized fabric and the flexible expanded polyurethane, regardless of which of the above fillers is added to the latter.

What is claimed is:

1. In the method for the manufacture of a composite laminated structure having a covering layer comprising a polyvinyl resin and an underlayer of flexible expanded polyurethane wherein a polyether or a polyester is reacted with an isocyanic compound for the production of the expanded polyurethane and wherein the expanded layer is heat-sealed by high frequency welding to the cover layer, the improvement comprising adding to the polyurethane-forming ingredients before reaction for the foam production a filler selected from the group consisting of vinyl polymers and copolymers which are in the form of a plastisol or plasticized powder.

2. A method according to claim 1, wherein the filler is added to the polyether or polyester before mixing same with the other polyurethane-forming ingredients.

3. A method according to claim 1 in which said filler is present in the flexible expanded polyurethane in an amount ranging from 5 to 70% by weight of said polyurethane.

4. A method according to claim 1 in which said vinyl polymer or copolymer is (a) straight polyvinyl chloride, (b) copolymers of vinyl chloride and vinylidene chloride containing less than 30% vinylidene chloride, or (c) a copolymer of vinyl chloride and vinyl acetate containing less than 20% of vinyl acetate.

5. A method according to claim 1 in which said vinyl polymer or copolymer is (a) straight polyvinyl chloride with a K value of 50–82, (b) copolymers of vinyl chloride and vinylidene chloride containing less than 30% vinylidene chloride and having a K value 60–70, or (c) a copolymer of vinyl chloride and vinyl acetate containing less than 20% of vinyl acetate and having a K value 40–60.

6. In the method for the formation of laminated structures having a covering layer comprising a polyvinyl resin and an underlayer of flexible expanded polyurethane, wherein a polyether or polyester having a molecular weight of 1500 to 5000 is reacted with an isocyanic compound, a catalyst, blowing agent and stabilizer and where the expanded layer is joined by high frequency welding to the cover layer, the improvement comprising adding to the polyether or polyester before reaction for the foam production a filler selected from the group consisting of vinyl polymers and copolymers which are in the form of a plastisol or plasticized powder.

7. A laminated structure produced according to the process of claim 1.

References Cited

UNITED STATES PATENTS

| | | | |
|---|---|---|---|
| 3,093,525 | 6/1963 | Wilson et al. | 156—306 X |
| 3,170,832 | 2/1965 | Wilson et al. | 156—306 X |
| 3,205,120 | 9/1965 | Flanders | 156—306 X |
| 3,244,571 | 4/1966 | Weisman | 156—273 X |
| 3,354,020 | 11/1967 | Copeland | 156—273 X |
| 3,393,119 | 7/1968 | Dugan | 156—273 X |
| 3,411,981 | 11/1968 | Thomas | 161—190 |
| 3,467,607 | 9/1969 | Kuryla et al. | 156—77 X |
| 3,486,968 | 12/1969 | Mater | 156—77 X |

CARL D. QUARFORTH, Primary Examiner

S. J. LECHER, Jr., Assistant Examiner

U.S. Cl. X.R.

156—77, 273, 306; 161—190; 260—2.5, 37, 859

PO-1050
(5/69)

UNITED STATES PATENT OFFICE
CERTIFICATE OF CORRECTION

Patent No. 3,535,196          Dated October 20, 1970

Inventor(s)   Cesare LABERINTI and Guido PAGANELLI

It is certified that error appears in the above-identified patent and that said Letters Patent are hereby corrected as shown below:

In the Abstract of the Disclosure, Column 1, line 22, insert -- of -- after "form".

Column 1, line 37, after "layers" insert -- are --.

Column 2, line 16, change "one-shot' to -- "one-shot" --.

Column 4, Recipe II, the following correction should be made:

Epoxidized soybean oil       3   3
    Barium-cadmium stabilizer    2   2

Claim 3, line 2, "flexibleexpanded" should be -- flexible expanded --.

SIGNED AND
SEALED
JAN 26 1971

(SEAL)
Attest:

Edward M. Fletcher, Jr.
Attesting Officer

WILLIAM E. SCHUYLER, JR.
Commissioner of Patents